(12) United States Patent
Waters

(10) Patent No.: US 7,896,250 B2
(45) Date of Patent: Mar. 1, 2011

(54) READING CARD

(76) Inventor: Michael Waters, Aspen, CO (US)

(*) Notice: Subject to any disclaimer, the term of this patent is extended or adjusted under 35 U.S.C. 154(b) by 936 days.

(21) Appl. No.: 11/673,337

(22) Filed: Feb. 9, 2007

(65) Prior Publication Data
US 2007/0170263 A1    Jul. 26, 2007

Related U.S. Application Data

(63) Continuation-in-part of application No. 11/327,573, filed on Jan. 6, 2006, now Pat. No. 7,188,775, which is a continuation of application No. 10/946,592, filed on Sep. 21, 2004, now Pat. No. 7,036,740.

(51) Int. Cl.
    *G06K 19/00* (2006.01)
(52) U.S. Cl. .................... 235/487; 235/492
(58) Field of Classification Search ............ 235/487, 235/492; 362/198, 200, 201, 240
See application file for complete search history.

(56) References Cited

U.S. PATENT DOCUMENTS

| | | | |
|---|---|---|---|
| 5,412,199 A | 5/1995 | Finkelstein et al. | |
| 5,434,405 A | 7/1995 | Finkelstein et al. | |
| 5,457,613 A | 10/1995 | Vandenbelt et al. | |
| 5,608,203 A | 3/1997 | Finkelstein et al. | |
| 5,856,661 A | 1/1999 | Finkelstein et al. | |
| 6,070,990 A | 6/2000 | Dalton et al. | |
| 6,176,430 B1 | 1/2001 | Finkelstein et al. | |
| D444,060 S | 6/2001 | Elsener, Sr. et al. | |
| 6,302,570 B1 | 10/2001 | Petell et al. | |
| 6,347,875 B1 | 2/2002 | Painsith | |
| 6,390,372 B1 | 5/2002 | Waters | |
| 6,447,143 B2 | 9/2002 | Krietzman et al. | |
| 6,565,232 B1 | 5/2003 | Goldstein et al. | |
| 6,632,097 B2 * | 10/2003 | Chang | 439/76.1 |
| 6,769,618 B1 | 8/2004 | Finkelstein | |
| 6,817,532 B2 | 11/2004 | Finkelstein | |
| 6,982,840 B1 * | 1/2006 | Schlief | 359/802 |
| 7,036,740 B2 | 5/2006 | Waters | |
| 2002/0136006 A1 | 9/2002 | Altman | |
| 2003/0090898 A1 | 5/2003 | Goldstein et al. | |
| 2003/0107884 A1 | 6/2003 | Krietzman et al. | |
| 2003/0189829 A1 | 10/2003 | Shimizu et al. | |
| 2003/0201331 A1 | 10/2003 | Finkelstein | |
| 2003/0223224 A1 | 12/2003 | Painsith et al. | |
| 2006/0064077 A1 * | 3/2006 | Peyman | 606/5 |

* cited by examiner

*Primary Examiner*—Allyson N Trail
(74) *Attorney, Agent, or Firm*—Fitch, Even, Tabin & Flannery

(57) ABSTRACT

A reading card is provided having a reading lens portion that is integrally molded in a unitary form with a card base. The lens portion is formed so as to have a well-defined diopter rating. Preferably, the lens portion includes convexly curved, continuously smooth, opposite light refractive surfaces. Generally, the lens portion can be thicker than a thin, generally flat remaining portion of the card base. The reading card can be implemented in a credit or debit card size, or used as a key ring holder. Optionally, the reading card includes a light source.

21 Claims, 11 Drawing Sheets

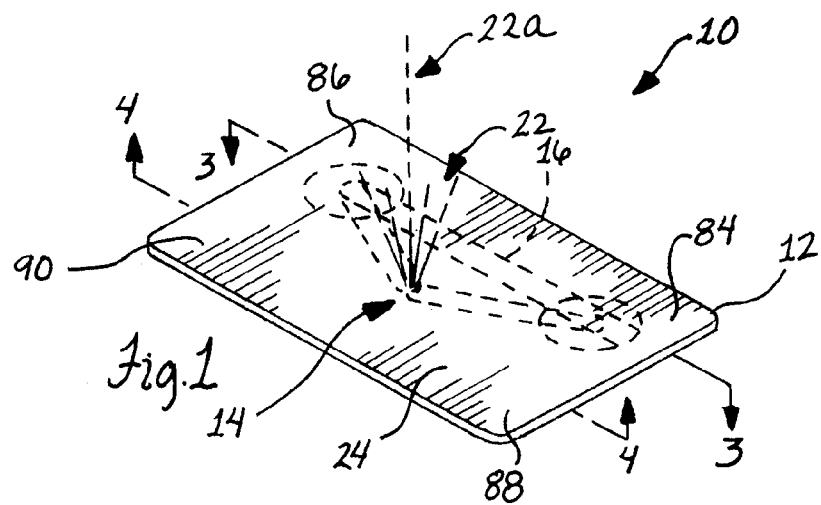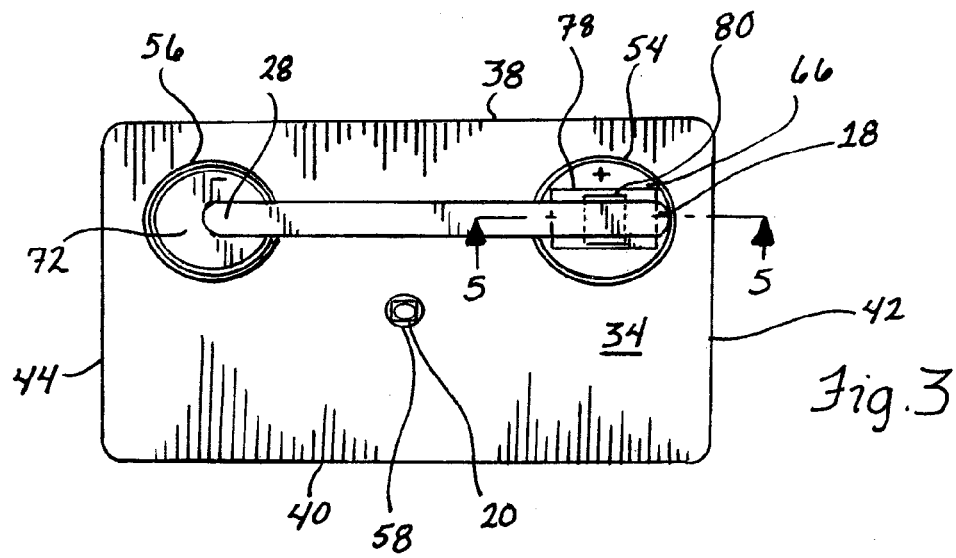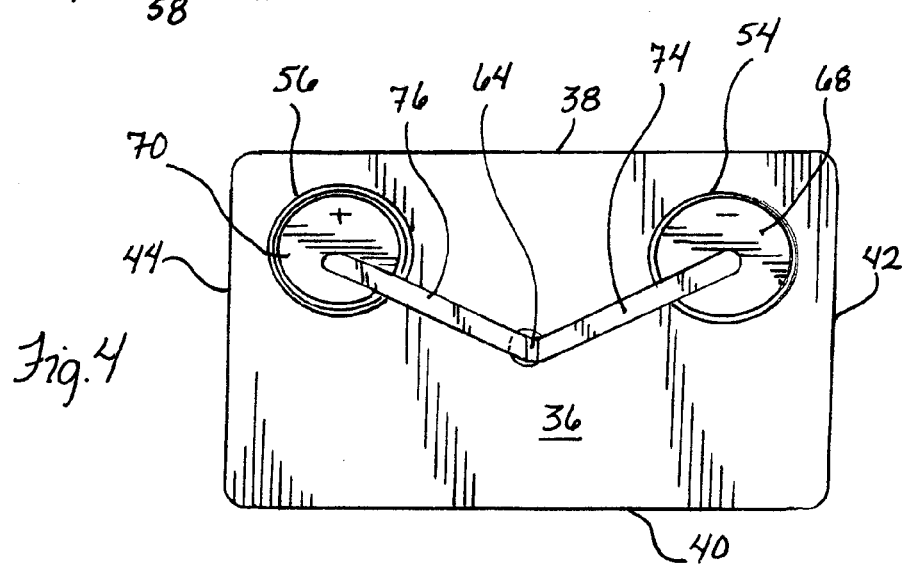

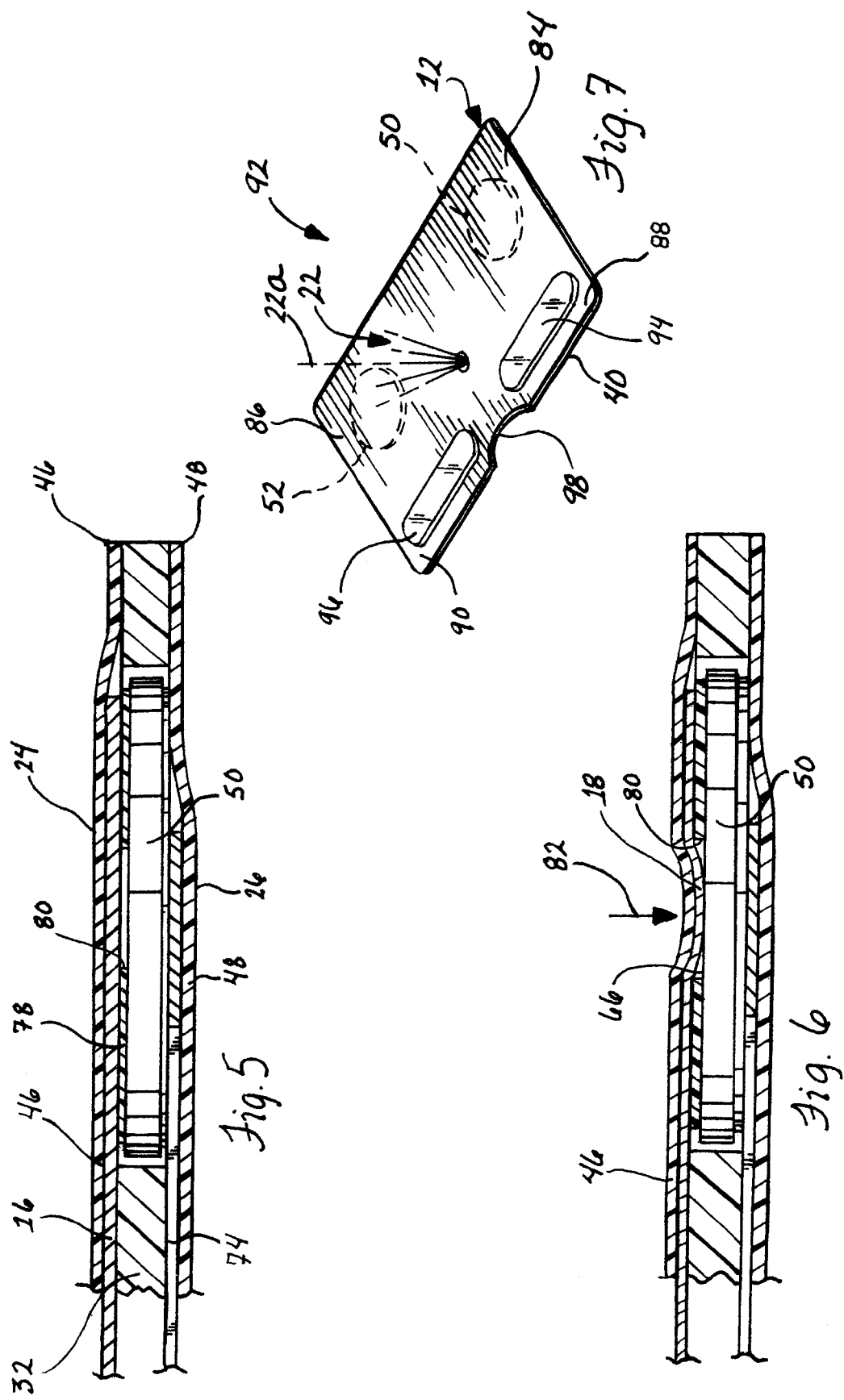

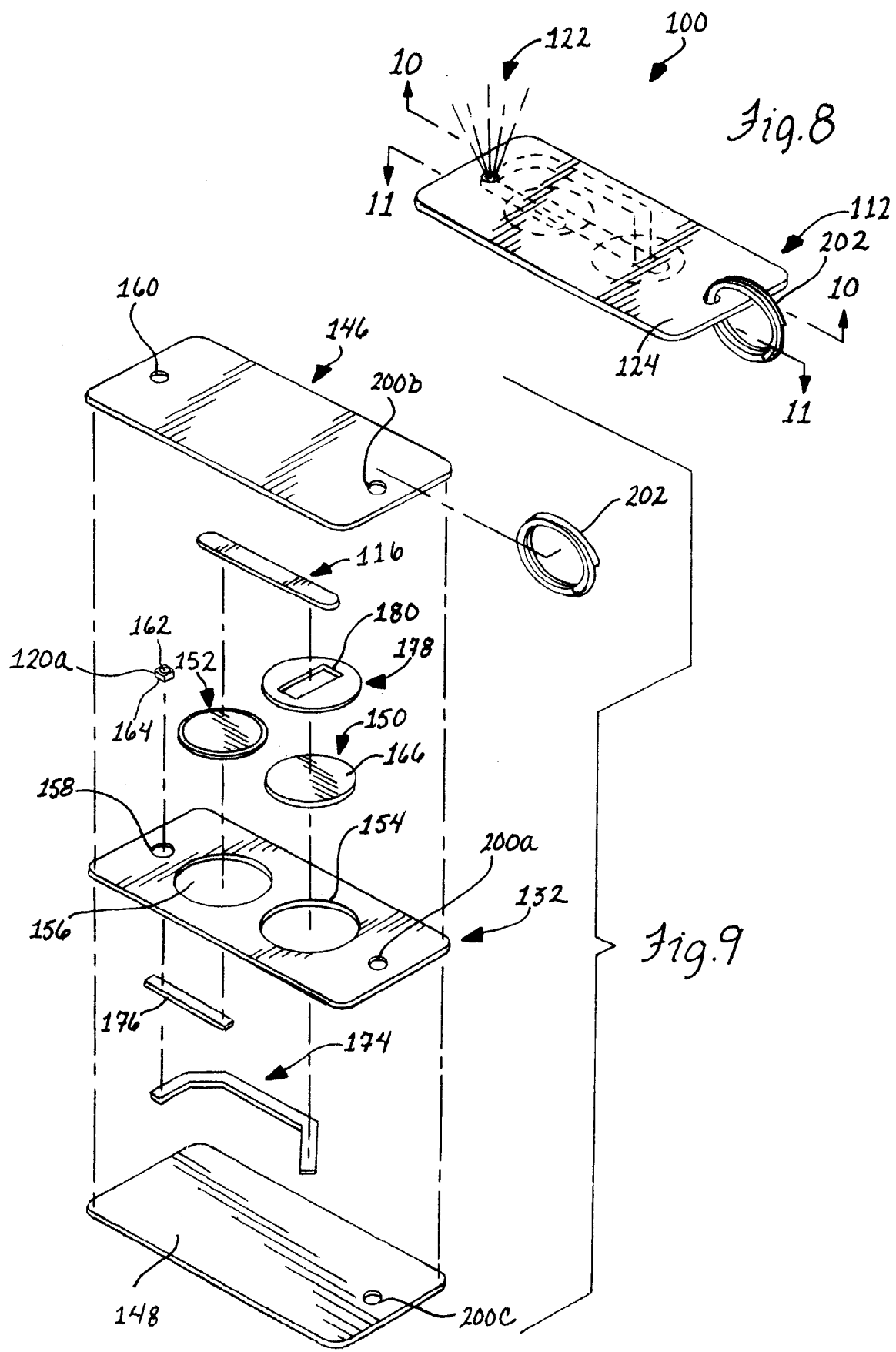

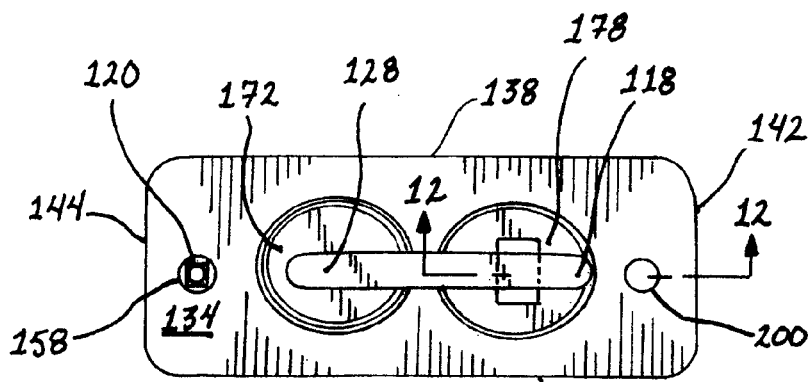
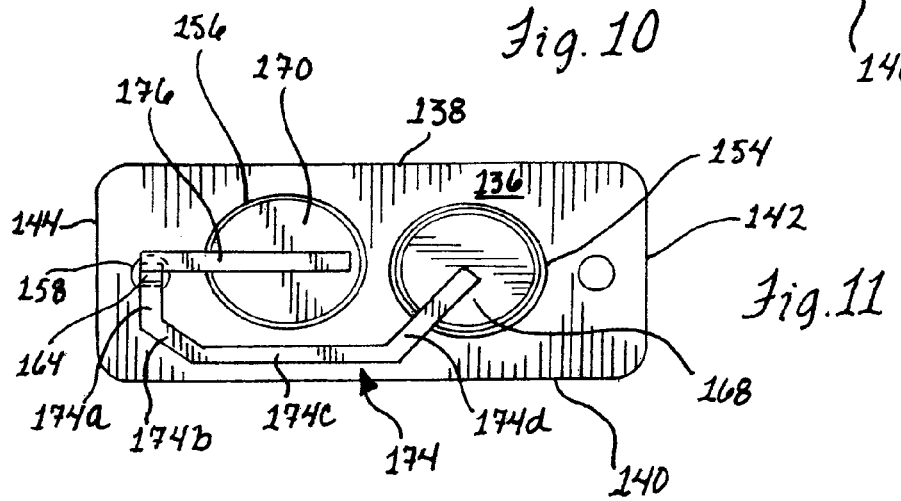
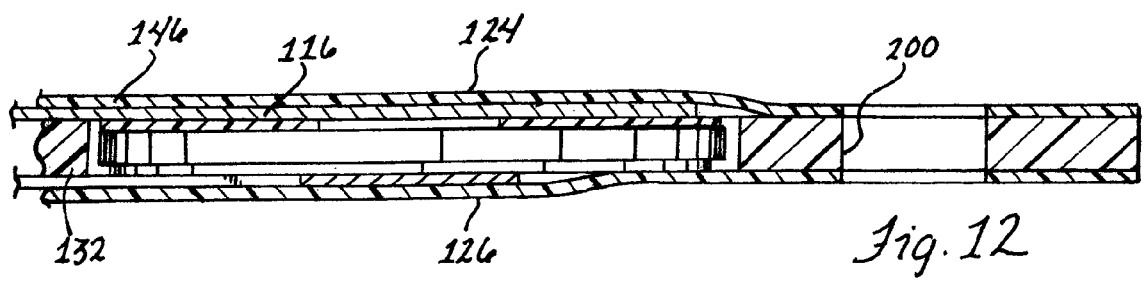
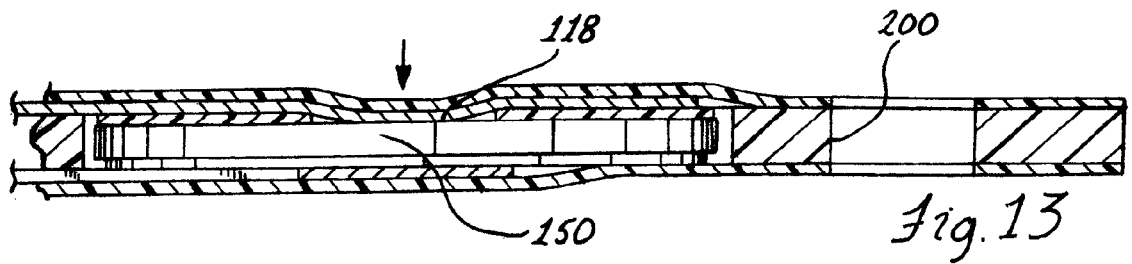

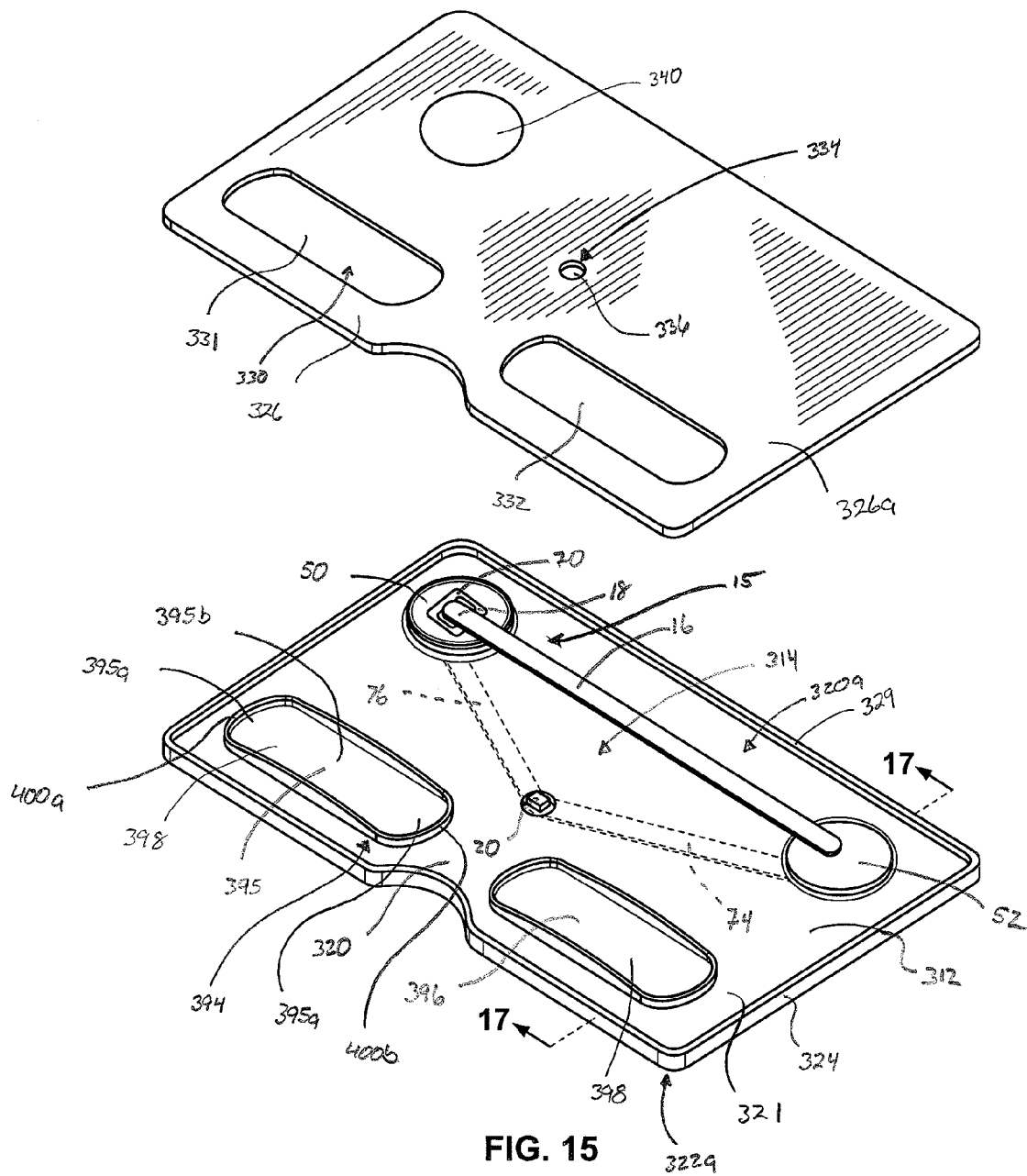
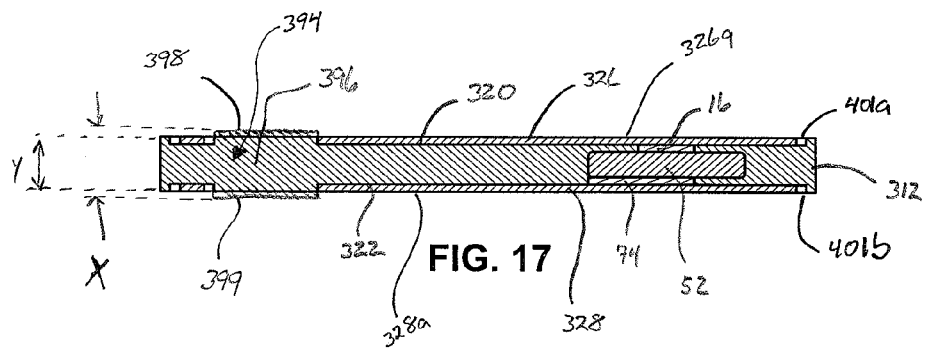
FIG. 15
FIG. 17

READING CARD

CROSS-REFERENCE TO RELATED APPLICATIONS

This application is a continuation-in-part of prior application Ser. No. 11/327,573, filed Jan. 6, 2006, which is a continuation of prior application Ser. No. 10/946,592, filed Sep. 21, 2004, now U.S. Pat. No. 7,036,740 B2, which are both hereby incorporated by reference as if reproduced in their entirety herein.

FIELD OF THE INVENTION

The invention relates to cards and, more particularly, to cards that provide a viewing enhancement function.

BACKGROUND OF THE INVENTION

Providing thin card members having a reading lens associated with a card body such as taught in applicant's U.S. Pat. No. 6,390,372 B1 advantageously provides a compact and low profile device that allows for enhanced viewing through the lens. Such devices may be carried in a wallet or purse similar to a traditional credit card and removed when needed. These reading cards, therefore, require little storage space when not needed as opposed to the much larger space needed to store reading glasses in one's purse or pocket.

Other cards include a Fresnel lens as generally disclosed in U.S. Pat. Nos. 6,769,618 B1 to Finkelstein; 6,176,430 B1 to Finkelstein et al.; and 5,434,405 to Finkelstein et al. The Fresnel lens can be formed integrally with the card base. The Fresnel lens can be stamped into the card body using a hot stamping die or from material that is poured into a cavity removed from the card base. As discussed in applicant's U.S. Pat. No. 6,390,372, which is incorporated by reference as if reproduced in its entirety herein, Fresnel lenses generally do not provide suitable viewing enhancement for reading purposes as the primary focus is magnification rather than vision correction. In this regard, Fresnel lenses generally have poor optics in terms of the resolution they provide creating blurring or distortion of the text to be read. Also, Fresnel lenses typically do not have a well-defined diopter rating which can vary sometime in the range of between four and six, which generally is more magnification than is necessary for reading lenses. Another drawback is that manufacture of Fresnel lenses usually requires a soft plastic material such as PVC for being pressed to form the concentric stepped grooves and ridges of these lenses. This softer lens material is not desirable for lenses incorporated into thin cards as they are likely to be damaged due to the handling they are intended to undergo. To this end, the '618 patent teaches recessing the Fresnel lens surface features from the adjacent surface of the card body.

Using lenses with well-defined diopter ratings is known for providing reading cards as taught in applicant's '372 patent. However, in these cards the lenses and the body of the card are separate components such that an opening in the body needs to be provided for receipt of the lens therein. This may cause an undesirable amount of flexibility in the relatively thin card body. Further, the interface between the edges about the opening at the peripheral edges of the lens needs to be carefully sized and configured to securely hold the lens to the card body. Accordingly, undue bending of the flexible card such as can occur when a user is sitting with the card carried in their back pocket may cause the lens to pop out or otherwise become dislodged from the card opening.

Providing lights on thin card members advantageously provides compact and low profile lighting devices for users thereof. However, known light cards are generally deficient in the switching mechanisms utilized to selectively power the lights carried thereby. Generally, when employing LEDs that include elongate positive and negative wire leads extending therefrom, it is known that mechanical stress on the leads should be avoided. However, where such LEDs are employed with lighted cards, there are switching mechanisms thereof that have required that one of the wire leads be bent each time the LED light is to be turned on (see U.S. Pat. No. 5,457,613 to Vandenbelt et al. and U.S. Pat. No. 6,070,990 to Dalton et al.). In addition to the undue stress on the LED leads generated by the switching mechanisms taught by the '613 and '990 patents, the '990 patent also teaches a tray-type card body having a thinned wall area aligned with the LED lead to be bent. The thinning of this wall portion allows it to be flexible so that a user can push on the wall portion and bend both it and the LED lead. As is apparent, both of these features are undesirable for the switching function in which they are implemented as it is anticipated that the light switch may be actuated thousands of times over the life of a light card. As such, this constant bending of the LED lead wire may ultimately cause premature failure of the LED. Similarly, where the main wall of the card also is thinned and constantly bent for switching the light on, there is the possibility that the thinned wall will fail over repeated cycling.

SUMMARY OF THE INVENTION

There is provided a reading card having a thin, credit-card sized construction that includes a card base with a reading lens portion that is integrally molded in a unitary form with the card base. In such form, the reading card has a more robust construction over multi-component reading cards including separate lenses and card bases because the reading lens is integral with the card base rather than being separate therefrom. If desired, the reading card may also include an optional light source to provide illumination to the viewing area as a user is looking through the reading lens.

Having the reading lens portion integrally molded in a unitary form with the card base is also advantageous because the card base and reading lens may be formed in the same mold, from the same material, and at the same time. Fabrication time and costs are therefore minimized as only a single mold is required and no additional assembly steps of inserting a separate lens into preformed openings in the card base is required.

The lens portion can also be molded into a reading lens having a generally well defined diopter rating to provide for precision vision correction, such as for individuals who are farsighted. In such form, the lens portion preferably includes a continuous, smooth outer surface having a curvature thereof for providing precision optics and high resolution for a user reading text therewith. Specifically, the outer surface of the reading lens portion is convex relative to the generally flat, main surface of the card base. Preferably, the lens portion is configured to provide a diopter rating of 2.0 or 2.5.

In a preferred form, the lens portion and card base are molded at the same time so that the integral reading lens portion is thicker than the remaining thin portion of the card base. That is, the reading lens has at least some portion of its light refractive surfaces that extend beyond the corresponding main surfaces of the card base. Due to the increased thickness over the card base, a robust construction is provided in the area most in need of strength enhancement, i.e., the lens, with such relatively thin reading cards. In addition, the integral lens and card body can be formed of a hard and durable molded plastic material, e.g., acrylic polycarbonate, which is not a suitable material for stamped Fresnel lenses. This material provides the thin card body with a robust construction. Accordingly, the preferred reading card including the integral reading lens thereof is contrasted with stamped Fresnel lenses which can be completely recessed from or at least include portions thereof recessed from the remainder of the card body and which are of softer material.

Prior cards having Fresnel lenses stamped into a card body are generally limited in terms of the thickness of the lens material to that of the thickness of the existing card body. To provide a thicker lens, other prior cards insert separate, thicker lenses into preformed openings, which presents the previously discussed risk that the lens may pop-out from the openings during repeated use. The reading cards described herein, on the other hand, provide the advantages of the thicker lens with a well defined diopter rating combined with a unitary, robust construction of the card base because the lens is integrally molded in a unitary form therewith and cannot be separated therefrom without destroying the card base. Therefore, even with repeated use and bending thereof, the integral reading lens of the reading cards herein will not separate from the card base.

BRIEF DESCRIPTION OF THE DRAWINGS

FIG. 1 is a perspective view of a light card in accordance with the present invention showing light being emitted from one of the opposite, main surfaces of the card;

FIG. 3 is a plan view taken along line 3-3 of FIG. 1 showing the elongate light bar having one end fixed to one of the disc batteries and the other end extending over the other disc battery and cantilevered from the fixed end;

FIG. 4 is a bottom plan view taken along line 4-4 of FIG. 1 show a pair of conductor bars extending from the surface mount LED to the disc batteries;

FIG. 5 is a cross-sectional view taken along line 5-5 of FIG. 3 showing the cantilevered end of the switch bar spaced from the disc battery therebelow by an insulator member;

FIG. 6 is a cross-sectional view similar to FIG. 5 showing the switch bar end pushed through an aperture in the insulator member into engagement with the disc battery for energizing the LED;

FIG. 7 is an alternative embodiment with the light card carrying a pair of viewing lenses;

FIG. 8 is a perspective view of another embodiment of the light card having a more compact form than the prior light cards of FIGS. 1-7;

FIG. 9 is an exploded perspective view of the light card of FIG. 8 including substantially similar components to the light card of FIG. 1 but having slightly different configurations and different locations due to the different size thereof;

FIG. 10 is a plan view taken along line 10-10 of FIG. 8 showing a switch bar spanning the disc batteries;

FIG. 11 is a bottom plan view taken along line 11-11 of FIG. 8 showing conductor bars extending from the LED to the disc batteries;

FIG. 12 is a cross-sectional view taken along line 12-12 of FIG. 10 showing the cantilevered end of the switch bar spaced over the disc battery therebelow;

FIG. 13 is a cross-sectional view similar to FIG. 12 showing the cantilevered end pushed through an aperture in the insulator member into engagement with the disc battery for energizing the LED;

FIG. 15 is an exploded view of the reading card of FIG. 14 showing an upper sheet member removed from the card base and the lens portions integrally molded therewith;

FIG. 17 is a cross-sectional view taken along line 17-17 of FIG. 15 showing a portion of the reading lens having a thickness greater than that of the remaining thin portion of the integral card base;

DETAILED DESCRIPTION OF THE PREFERRED EMBODIMENTS

Figure 2:
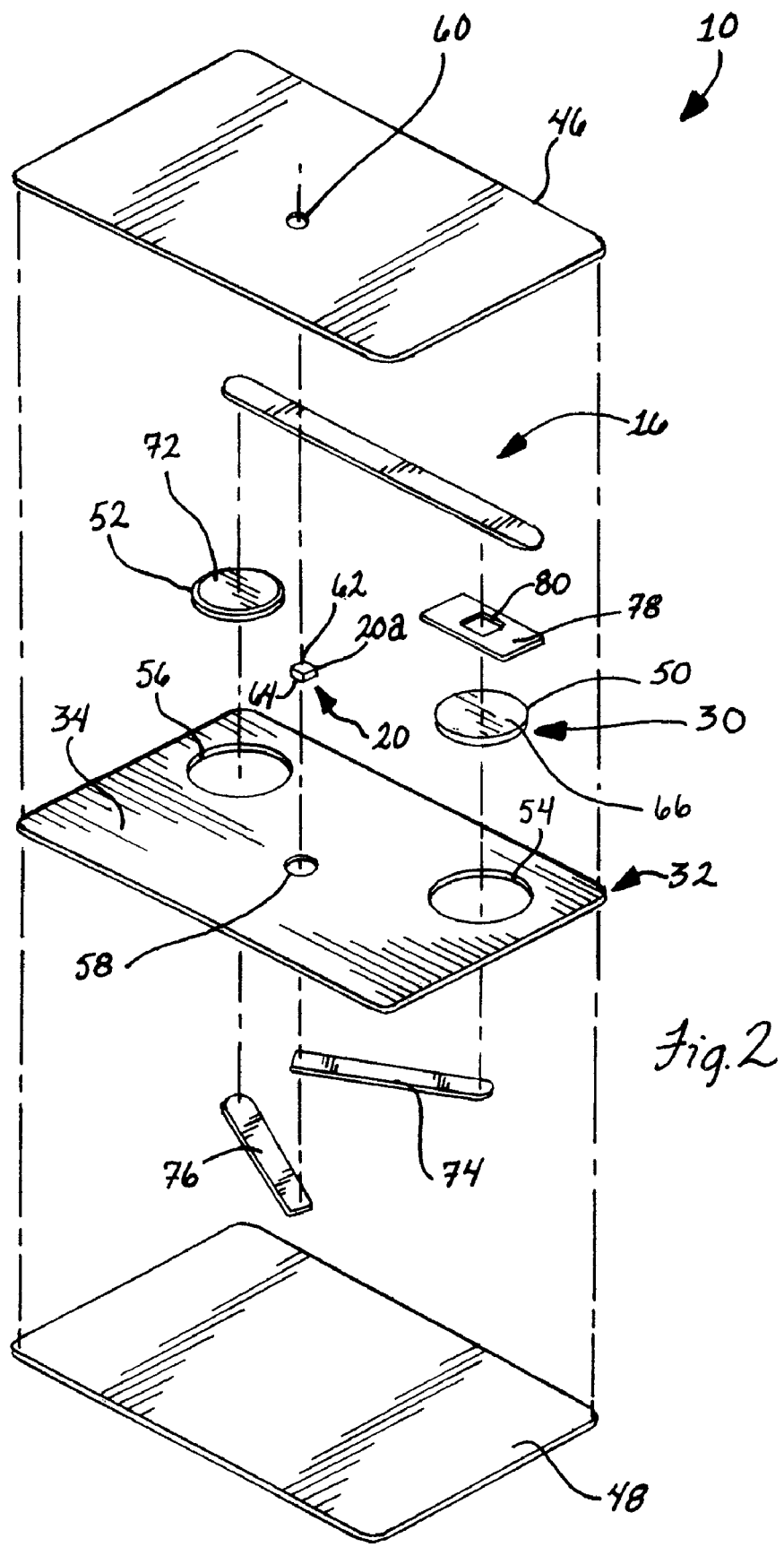
FIG. 2 is an exploded, perspective view of the light card of FIG. 1 showing a thin rigid body to which a switch bar, a pair of disc batteries and a surface mount LED are mounted with upper and lower sheets for being attached to the body.
Figure 14:
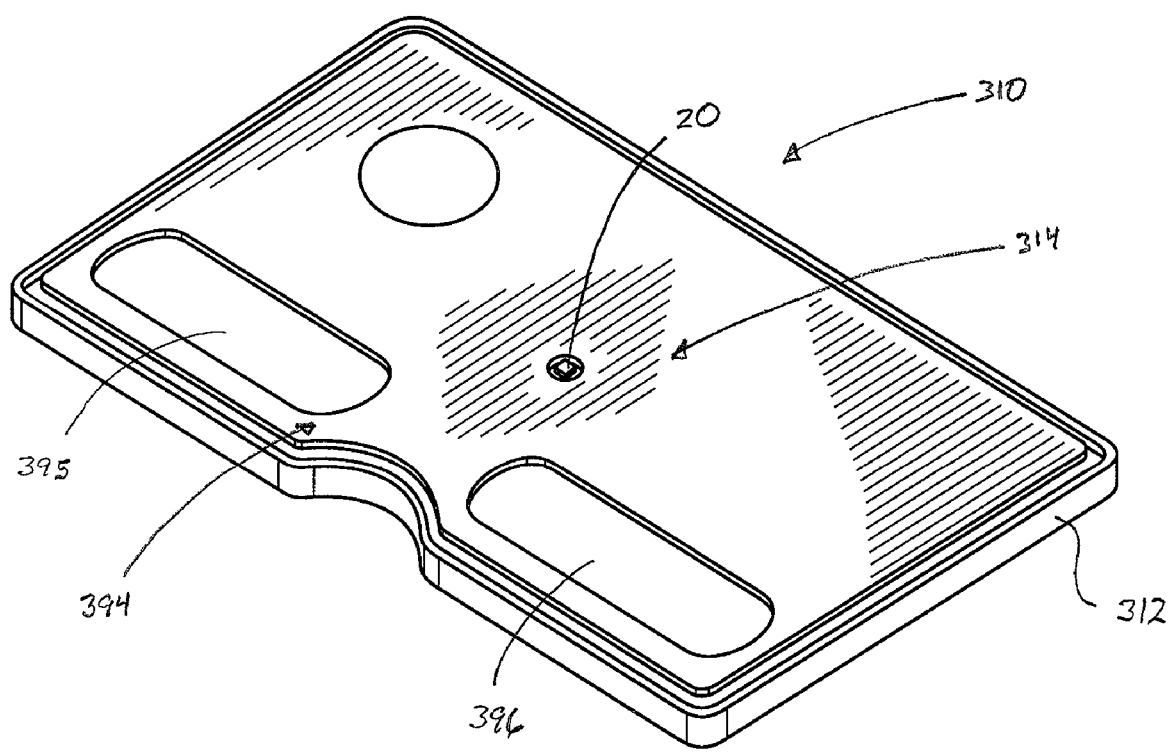
FIG. 14 is perspective view of a reading card in accordance with another form of the present invention having a pair of spaced reading lens portions and a light.

In FIGS. 1 and 2, a light card 10 is shown including a card member 12 that carries a light source 14 and a switch bar 16 that is operable to energize the light source 14. It is preferred that the switch bar 16 be independent or distinct from the light source 14 so that its operation to perform the switching function thereof does not mechanically affect the components of the light source 14 and thus is solely operable to provide power to or remove power from the light source 14. In addition, the switch bar 16 can be arranged and configured so that it is easy to engage and push the switch bar 16 and in particular end 18 thereof for flexing the bar 16 to energize the light source 14. In this regard, it is preferred that the switch bar 16 have an elongate and thin, flat strip configuration and be of a resilient, conductive metallic material. In this manner, the switch bar or strip 16 is designed to be robust and withstand flexing thereof over thousands switching cycles without adversely affecting operation of the present light card 10. The flat configuration of the switch bar 16, and particularly at the integral end 18 thereof provides a surface area that is sufficiently large so that a user can readily push the end 18 for activating the light source 14, and without necessitating additional larger components attached thereto for this purpose such as the additional rectangular conductive member attached to the LED wire lead in the previously discussed '613 patent.

The light card 10 herein is preferably configured with dimensions akin to that of a credit card so that it can be easily carried in a person's pocket, wallet or the like. In addition to the illumination function, the light card 10 can also be implemented on a credit card, debit card or other types of cards which can have raised indicia and/or coded information thereon such as by a magnetic strip. This information typically will relate to the owner of the credit or debit card, for example. The switch bar 16 allows for a use of a low profile light source 14 such as the illustrated surface mount LED 20 as the switch bar 16 does not rely on bending of a wire lead of a more standard, larger LED as in the prior light cards of the '613 and '990 patents. With the surface mount LED, a cone of light 22 can be projected from at least one of the opposite surfaces or faces 24 and 26 of the card member 12. As can be seen in FIG. 1, the LED 20 is mounted to emit light from the surface 24. This is in contrast to the larger prior LEDs including the lead wires that generally have to be mounted along one of the edges of the card member.

Another advantage provided by the switch bar 16 is that the end 28 opposite end 18 is fixed relative to the card member 12. Accordingly, with the elongate, strip form of the switch bar 16, the other end 18 of the switch bar 16 is cantilevered from the fixed end 28 out over a thin power source 30 that is mounted to the card member 12. In this manner, the elongate, switch bar 16 provides a lever arm so that it is relatively easy for a user to push the cantilevered end 18 down into electrical contact or engagement with the power source 30 for energizing the LED 20 to generate the light cone 22 therefrom, as will be described more fully hereafter.

Turning to more of the details, the card member 12 can have a variety of constructions to provide it with a relatively rigid but somewhat flexible construction, as common with credit and debit cards. As illustrated, the card member 12 includes a thin card body 32 that can be of generally rigid material, such as plastic. The card body 32 has opposite, main surfaces 34 and 36 corresponding to card member surfaces 24 and 26. The card body 32 has a generally rectangular configuration with parallel long side edges 38 and 40 that are interconnected by generally parallel short side edges 42 and 44. Similarly configured rectangular sheets 46 and 48 are attached such as by lamination to the card member body 32 on respective surfaces 34 and 36 thereof. By way of example and not limitation, the long edges 38 and 40 can be approximately 3¼ inches in length, while the short edges can be approximately 2 inches in length.

The thin power source 30 can be in the form of a lithium disc battery 50, and preferably a pair of identical disc batteries 50 and 52, as can be seen best in FIGS. 2-4. The card body 32 has a pair of openings 54 and 56 that extend through to both sides or surfaces 34 and 36 of the card body 32. The through openings 54 and 56 have a diameter slightly larger than the corresponding disc batteries 50 and 52 so that they can fit therein, as can be seen in FIGS. 3 and 4. Similarly, a much smaller through hole or aperture 58 is provided in the card body 32 into which the surface mount LED 20 is fit. The surface mount LED 20 is oriented so that the light cone 22 is projected from the card body surface 34 and thus card member surface 24 formed on the sheet 46. As such, sheet 46 also is provided with a small through aperture 60 that is aligned with aperture 58 and LED 20 therein when attached to the card body 32. On the other hand, backing sheet 48 can have a solid construction.

The surface mount LED 20 has a body 20a having a small, flat, square-chip configuration for fitting in the small aperture 58, as described above. The LED body 20a emits light from its front side 62 and has a pair of electrical contacts formed on the back side 64 thereof. The disc batteries 50 and 52 each include opposite positive and negative conductive surfaces. Accordingly, disc battery 50 has a positive surface 66 and a negative surface 68 that are exposed and accessible on either side of the opening 54 and disc battery 52 has a positive surface 70 and a negative surface 72 that are exposed and accessible on either side of the through opening 56. Referencing FIGS. 2-4, it can be seen that the disc batteries 50 and 52 are arranged oppositely to each other relative to the card body 32. In other words, disc battery 50 has its positive surface 66 accessible along the card body surface 34, whereas disc battery 52 has its negative surface 72 accessible along the card body surface 34, as shown in FIG. 3. On the other hand, disc battery 50 has its negative surface 68 accessible along the card body surface 36, and disc battery 52 has its positive surface 70 accessible along the card body surface 36, as shown in FIG. 4.

Continuing reference to FIG. 4, the LED chip 20a is placed in the aperture 58 so that its back surface 64 including the electrical contacts or conductors formed thereon are accessible in the opening 58 from the card surface 36. A pair of conductive bars 74 and 76 extend from the batteries 50 and 52 to the LED body 20a into electrical contact therewith. Similar to switch bar 16, the conductor bars 74 and 76 can have a substantially flat and low-profile, strip configuration. The conductor bar 74 has one end fixed to the negative surface 68 of the disc battery 50, and its other end fixed to the positive contact formed on the back side 64 of the LED chip body 20a. The conductor bar 76 has one end fixed to the positive surface 70 of the disc battery 52 and its other end is fixed to the negative contact formed on the LED chip body 20a.

Accordingly, to complete the circuit and energize the LED 20, the switch bar 16 needs to be in electrical contact with both the positive surface 66 of battery 50 and the negative surface 72 of battery 52. As shown in FIG. 3, the fixed end 28 of the switch bar 16 is attached to the negative surface 72 of battery 52. On the other hand, the cantilevered end 18 of the switch bar 16 is spaced from the positive surface 66 of the battery 50 so that normally the LED 20 is not energized or provided with power from the batteries 50 and 52. Thus, both ends 18 and 28 of the switch bar 16 are spaced from the electrical contacts of the LED 20. Manifestly, if only one disc battery is employed, then the cantilevered end 18 of the switch bar 16 will be disposed over the single disc battery, and the fixed end 28 will be attached to one of the LED contacts.

To keep the switch bar end 18 spaced from the battery surface 66, an insulator member 78 is disposed between the switch bar end 18 and the battery surface 66, as shown in FIGS. 2, 3 and 5. The member 78 has a thin, substantially flat configuration and is of an insulative material. The insulator member 78 further includes a window opening 80 which allows the flexible bar end 18 to be pushed therethrough. Accordingly, for a user to energize or provide power to the LED 20 to generate light 22, they press on the sheet 46 in the area generally aligned with the switch bar end 18 and insulator member window 80. This pushing force causes the thin, flexible sheet member 46 along with the flexible, cantilevered switch bar end 18 to deflect relative to the more rigid card body 32 and resiliently shift toward the disc battery 50, as shown in FIG. 6. The switch bar end 18 can be moved through the insulator member window 80 into engagement with the battery surface 66 to complete the circuit, thus switching the LED 20 to its on condition and generating light 22 therefrom. The direction of this pushing force to operate the switching mechanism described herein is generally along arrow 82 in a transverse direction to the plane of the card member 12, and more specifically orthogonal to the plane of the card member 12. Once the user desires to switch the LED 20 to its off condition, they remove the pushing force from the card member in the direction 82, and the resiliency of the switch bar 16 will cause its flexible end 18 to return to its original substantially straight configuration, extending along the card body surface 34, as shown in FIGS. 3 and 5.

In the illustrated and preferred form, the LED 20 is disposed approximately centrally in the rectangular card member 12 relative to the card member peripheral edges 38-44, and thus spaced completely inwardly therefrom. In addition, the batteries 50 and 52 are located at corner areas 84 and 86 adjacent the long edge 38 of the card member 12. Thus, the switch bar 16 extends along the card body surface 34 adjacent and parallel to the edge 38, and the conductor bars 74 and 76 extend from the corner areas 84 and 86 along the card body surface 36 obliquely relative to the card edges 38-44 to the center of the card member 12. As can be seen in FIG. 1, the switch bar 16 and conductor bars 74 and 76 have a triangular arrangement.

This arrangement of the components of the light card 10 herein leaves the corner areas 88 and 90 adjacent the card member edge 40 free of such components. The above-described arrangement is particularly well suited where the light card 10 is employed as a viewing card 92, as depicted in FIG. 7. In the viewing card 92, the card member 12 carries a pair of laterally spaced, viewing lenses 94 and 96 that can have an oblong or obround configuration so that they extend into the respective card member corner areas 88 and 90 and extend generally adjacent to and along the card member edge 40. The lenses 88 and 90 are of a refractive material to provide a predetermined viewing correction therewith e.g. diopter rating, and are carried in similarly shaped openings formed in the card member 12 in the corner areas 88 and 90 thereof. An arcuate indent or notch 98 can be formed centrally along the card member edge 40 generally between the lenses 94 and 96. The centrally disposed LED 20 is thus aligned with the notch 98 in an area extending between the laterally spaced lenses 94 and 96. As an alternative to the pair of lenses 94 and 96, a single lens could be employed. For details regarding how the viewing card 92 can carry the lenses 94 and 96 as well as other features that can be implemented in the viewing card 92, reference should be had to applicant's U.S. Pat. No. 6,390,372, which is incorporated by reference as if reproduced in its entirety herein.

The use of a surface mount LED 20 as previously described is particularly useful with the light card 92 as the surface mount LED 20 emits its light cone 22 in the general viewing direction one would have looking though the lenses 94 and 96 of the light card 92. In other words, the surface mount LED 20 is positioned so that its light cone 22 is projected from surface 24 of the card member 12, with light cone axis 22a extending substantially perpendicular to the card member surface 24. In this way, the LED 20 is positioned to maximize the illumination of the viewing area as a user is looking through the lenses 94 and 96. To use the light card 94, a user can grasp the card member 12 at the corner area 84 thereof, and use the notch 98 to rest the light card 92 on the bridge of their nose with the lenses 94 and 96 generally aligned with their eyes and the card surface 26 facing their face. To provide for illuminated viewing through the lenses 94 and 96, the user merely depresses the switch bar end 18 into engagement with the battery 50 by directing a pushing force in direction 82 where indicated on the card member surface 24.

FIGS. 8-13 illustrate an even more compact light card 100 whose dimensions are more suited to use as a key ring holder than a credit and/or debit card similar to light card 10. For the most part, the components in light card 100 and their functional operation are the same as the light card 10 but for their size and configuration to accommodate the smaller space available with card 100, which can have a rectangular configuration of approximately 1.25 inches by 2.75 inches, for example.

Instead of the triangular arrangement of the straight switch bar 16 and straight conductor bars 74 and 76 as in light card 10, the light card 100 has a straight switch bar 106 and a straight conductor bar 176 with the other conductor 174 having a non-linear or bent configuration with several straight segments 174a-d. This is due to the mounting of the disc batteries 150 and 152 and LED 120 in a substantially straight line arrangement along the smaller card member 112. The bent conductor bar 174 extends from the LED 120 to the disc battery 150 while fitting around the disc battery 152, as will be discussed more fully hereinafter.

The surface mount LED 120 is mounted to the card member 112 to emit light from one of the main, opposite surfaces 124 and 126 thereof. As shown in FIG. 8, the LED 120 is mounted to project its light cone 122 from the surface 124. The switch bar 116 has a similar construction to switch bar 16 except it is shorter due to the smaller size of the card member 112. Accordingly, the elongate, strip switch bar 116 has a cantilevered end 118 that extends out over the disc battery 150 from a fixed end 128 that is attached to the disc battery 152.

The card member 112 also has a laminated construction similar to card member 12 including a thin card body 132 having opposite main surfaces 134 and 136 corresponding to card member surfaces 124 and 126. As previously mentioned, the card body 132 has a rectangular configuration with long edges 138 and 140 interconnected with short edges 142 and 144. Similarly configured rectangular sheets 146 and 148 are attached as by lamination to the card member body 132 on respective surfaces 134 and 136 thereof.

The card body 132 has a pair of through openings 154 and 156 sized for fitting the corresponding disc batteries 150 and 152 therein. A small through hole or aperture 158 is provided in the card body 132 into which the surface mount LED 120 is fit. The surface mount LED 120 is oriented so that the light cone 122 is projected from the card body surface 134 and thus card member surface 124 formed on the sheet 146. As such, sheet 146 also is provided with a small through aperture 160 that is aligned with aperture 158 and LED 120 therein when attached to the card body 132.

The LED body 120a emits light from its front side 162 and has a pair of electrical contacts formed on the back side 164 thereof. The disc batteries 150 and 152 each include opposite positive and negative conductive surfaces. Accordingly, disc battery 150 has a positive surface 166 and a negative surface 168 that are exposed and accessible on either side of the opening 154 and disc battery 152 has a positive surface 170 and a negative surface 172 that are exposed and accessible on either side of the through opening 156. As with light card 10, the disc batteries 150 and 152 are arranged oppositely to each other relative to the card body 132, as shown in FIGS. 10 and 11. The disc battery 150 has its positive surface 166 accessible along the card body surface 134, whereas disc battery 152 has its negative surface 172 accessible along the card body surface 134, as shown in FIG. 10. On the other hand, disc battery 150 has its negative surface 168 accessible along the card body surface 136, and disc battery 152 has its positive surface 170 accessible along the card body surface 136, as shown in FIG. 11.

Continuing reference to FIG. 11, the LED chip 120a is placed in the aperture 158 so that its back surface 164 including the electrical contacts or conductors formed thereon are accessible in the opening 158 from the card surface 136. As previously discussed, the conductive bars 174 and 176 extend from the batteries 150 and 152 to the LED body 120a into electrical contact therewith. The conductive bar 174 has one end fixed to the negative surface 168 of the disc battery 150, and its other end fixed to the positive contact formed on the backside 164 of the LED chip body 120a. The conductor bar 176 has one end fixed to the positive surface 170 of the disc battery 152 and its other end is fixed to the negative contact formed on the LED chip body 120*a*.

Referring to FIG. 11, the disc battery openings 154 and 156 are spaced approximately centrally between the long edges 138 and 140 of the card member 112 with opening 154 spaced approximately the same distance from edge 142 as the opening 156 is spaced from the opposite edge 144. The LED opening 158 is arranged in the area of the card body 132 between edge 144 and opening 156. As shown, the openings 154, 156 and 158 have their centers generally aligned with each other with the axis extending through these centers being parallel to the card edges 138 and 140. The conductor bar 176 extends between the LED body 120*a* and the battery surface 170 in a straight line configuration generally along this same axis. However, due to the larger size of the battery opening 156 versus the LED opening 158, the conductor bar 174 has a non-linear or bent configuration so that it can extend from the LED body 120*a* in the opening 158 around battery opening 156 and to the battery 150, and specifically the surface 168 thereof located in opening 154. The conductor bar 174 can consist of several linear segments 174*a*-174*d* with segment 174*a* extending adjacent to and parallel to the edge 144, and segment 174*c* extending adjacent to and parallel to the edge 140. Conductor bar segment 174*b* extends obliquely to the adjacent edges 140 and 144 and interconnects the bar segments 174*a* and 174*c*. Finally, segment 174*d* extends from the segment 174*c* obliquely to adjacent edge 140 and into electrical contact with the battery surface 168 at the end thereof.

To complete the circuit and energize the LED 120, the switch bar 116 needs to be in electrical contact with both the positive surface 166 of battery 150 and the negative surface 172 of battery 152. As can be seen in FIG. 10, the fixed end 128 of the switch bar 116 is attached to the negative surface 172 of battery 152. On the other hand, the cantilevered end 118 of the switch bar 116 is spaced from the positive surface 166 of the battery so that normally the LED 120 is not energized or provided with power from the batteries 150 and 152. Thus, both ends 118 and 128 of the switch bar 116 are spaced from the electrical contacts of the LED 120.

To keep the switch bar end 118 spaced from the battery surface 166 and insulator member 178 can be disposed between the switch bar end 118 and the battery surface 166, as shown in FIGS. 9, 10 and 12. The insulator member 178 may differ slightly from insulator member 78 in that it covers the entire battery surface 166 except for the portion exposed in the window 180 thereof. Accordingly, for a user to energize or provide power to the LED 120 to generate light 122, they press on the sheet 146 in the area generally aligned with the switch bar end 118 and insulator member window 180. This pushing force causes the thin, flexible sheet member 146 along with the flexible, cantilevered switch bar end 118 to shift toward the disc battery 150, as shown in FIG. 13.

The reduced size of the light card 100 allows it to be used as a key ring holder, as it can readily fit in a person's pocket as previously mentioned. For this purpose, a through aperture 200 can be punched in the card member 112 in the area between the battery opening 154 and the card edge 142. As can been seen best in FIGS. 10 and 11, this opening 200 can be aligned with the centers of the battery openings 154 and 156, and the LED opening 158. Like the LED opening 158, the through opening 200 is centrally disposed intermediate the edges 138 and 140. A key ring 202 can be inserted to extend through the through opening 200 for use in attaching keys to the light card member 100. Unlike the LED opening 158 which does not extend all the way through the card member 112 as there is no corresponding opening therefor formed in sheet member 148, the key ring opening 200 is a through opening that extends through the full thickness of the card member 112 to open to both main surfaces 124 and 126 thereof, as illustrated in FIGS. 12 and 13. Accordingly, the through opening 200 includes aligned through openings 200*a*-*c* formed in the card member body 132 and the sheet members 146 and 148, as shown in FIG. 9.

Referring to FIGS. 14-17, there is illustrated a reading card 310 that includes a card body member or base 312 having a reading lens portion 394 integrally molded in a unitary form therewith to simplify fabrication of the reading card 310 and provide it with a robust construction. In this particular embodiment, the reading lens portion 394 includes a pair of spaced reading lens portions 395 and 396, which are both integrally molded in a unitary form with the card base 312. The illustrated card member 312 also includes an optional light source 314 for providing illumination for reading therewith.

Figure 16:
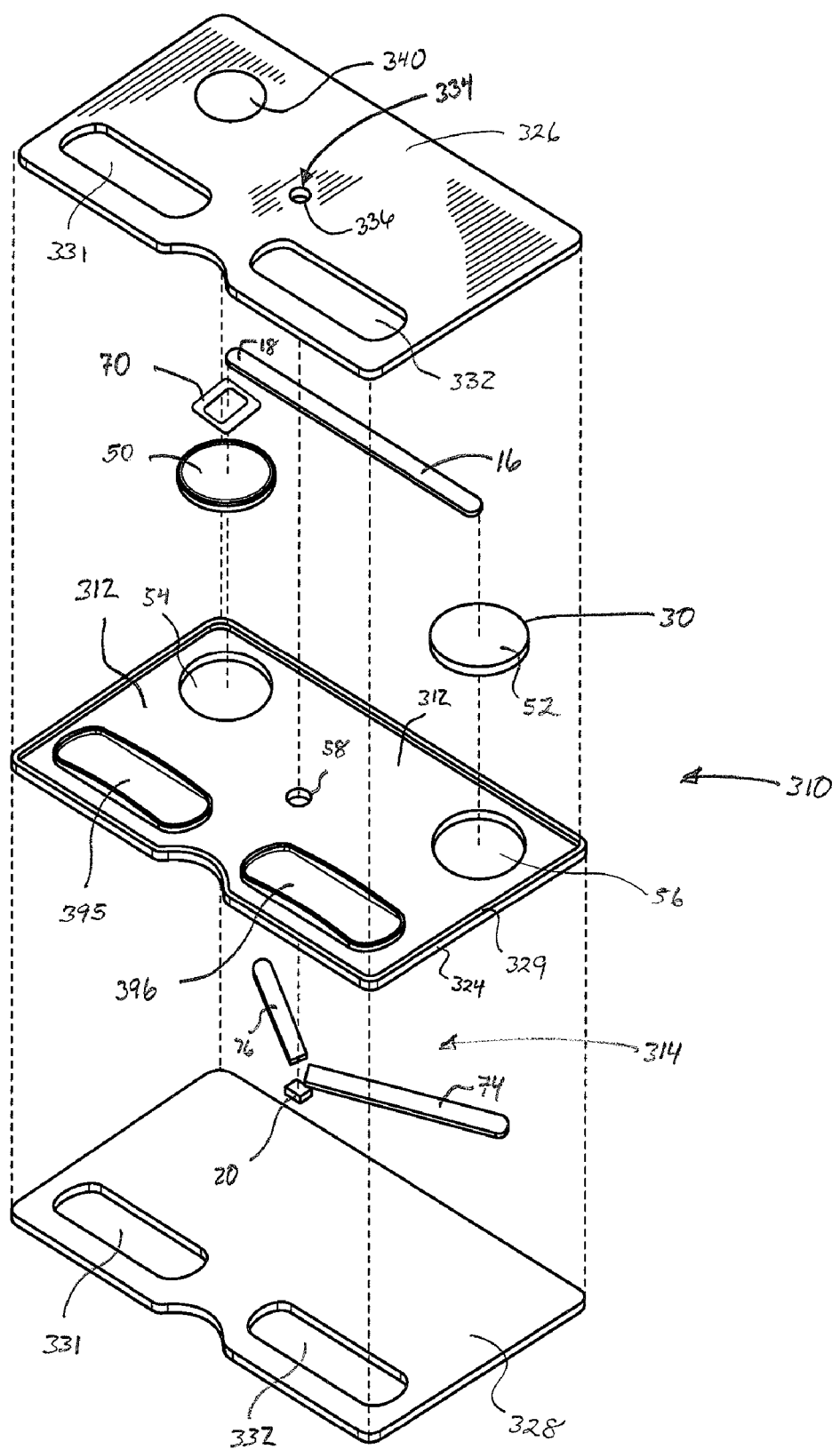
FIG. 16 is an exploded view of the reading card of FIG. 15 showing a lower sheet member and the components of a switching mechanism for the light similar to that of FIG. 2.
Figure 18:
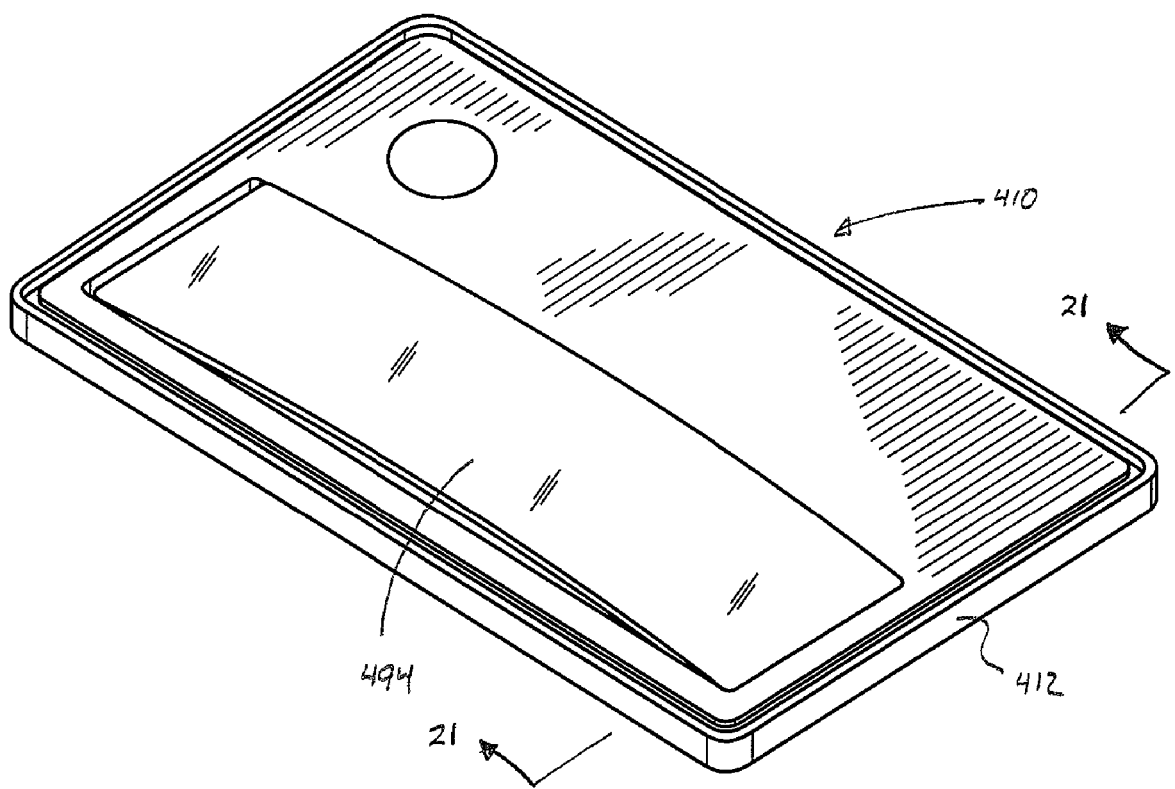
FIG. 18 is a perspective view of an alternative reading card having an enlarged, integral reading lens portion.

The optional light source 314 and switching mechanism 15 therefor may be similar to that previously described for the other light cards. Accordingly, as shown in FIGS. 15 and 16, the light card 310 preferably includes the surface mount LED 20, the switch bar 16, the thin power source 30 in the form of two disc batteries 50 and 52, and the pair of conductive bars 74 and 76. Further, the insulator member 70 is employed to keep the end 18 of the switch bar 16 spaced from the battery 50 until the switch bar end 18 is pushed into contact with the power source 30 by the user.

Referring to FIGS. 15-17, the card base 312 is preferably of a thin, molded plastic material having a configuration and size of a typical credit or debit card. In this regard, the card base member 312 has opposite, generally flat surfaces including upper main surface 320 and lower main surface 322 that both have a generally matching rectangular shape and that extend generally parallel to each other with a relatively thin thickness therebetween, e.g., approximately ⅟₁₆ inch. These surfaces 320 and 322, and particularly upper surface 320, may have raised portions such as embossed characters but otherwise have a generally flat configuration. Edge surface 324 extends around the periphery of the card base 312 including the main surfaces 320 and 322 thereof. As with the other light cards, the card base 312 preferably includes the spaced through openings 54 and 56 sized to fit the disc batteries 50 and 52 therein as well as the aperture 58 in which the LED 20 fits (FIG. 16).

As mentioned above, the lens portion 394 is integrally molded with the card base 312. That is, the reading lens portion 394 is formed in the same mold and from the same hard plastic material, e.g., acrylic polycarbonate, as the card member 312. Such construction permits the integral lens portion 394 to be precisely formed as a reading lens having a generally well defined diopter rating to provide enhanced optics over Fresnel-type lenses. In such form, the lens portion 394 includes a continuous smooth surface 398 having a predetermined curvature thereof for refracting light therethrough (FIG. 15). Specifically, the curvature of the light refractive surface 398 of the reading lens portion 394 is curved outwardly or convexly relative to the corresponding upper flat surface 320 of the card body 312.

The lens portion 394 preferably includes smooth, curved light refractive surfaces on both sides thereof. Accordingly, the reading lens portion 394 includes the convex upper light refractive surface 398 and a convex lower light refractive surface 399. Similar to the outer lens surface 398 described above, the lower convex surface 399 is preferably curved outwardly from the corresponding lower flat surface 322 to extend away from the remainder of the card base 312 in a direction opposite that of the upper outer surface 398.

As best shown in FIGS. 15 and 17, the curvature of the light refractive surfaces 398 and 399 is such that these surfaces extend beyond the main surfaces 320 and 322 of the remaining thin, generally flat portion 321 of the card base 312 to be spaced outwardly therefrom. Where the lens curved surfaces 398 and 399 curve up from the corresponding base surfaces 320 and 322 such as at the longitudinal ends 400*a*, 400*b* of the lens surfaces 398 and 399, then the lens 394 will have a greater thickness than the card base 312 except at these lens ends 400*a*, 400*b*. In any event, there will be at least a portion of the reading lens 394 that will have a thickness X that is greater than thickness Y of the card base thin portion 321.

Alternatively, the lens portions 395 and 396 may be thicker than the card thin portion 321 at all locations of the lens portions 395 and 396 even at the lens ends 400*a* and 400*b* so that the entire extent of the lens portion curved, light refractive surfaces 398 and 399 extends beyond the base surfaces 320 and 322 to be spaced outwardly therefrom. In either case, it will be appreciated that the spacing between the lens outer surfaces 398, 399 and the corresponding main body surfaces 320, 322 can vary along the length and/or width of the lens due to the preferred convex curvature of the lens portion 394. That is, for example, opposite end portions 395*a* of the lens 395 will preferably be more closely spaced to the main surface 320 than central portion 395*b* of the lens 395 due to its convex curvature. For example, the card base 312 can be about 1/16 inch thick, while at the end edge 400*a* or 400*b* the lens portion will be just slightly thicker than about 1/16 inch, and at the center the lens portion 395*b* can be about 3/16 inch thick.

As shown in FIGS. 15 and 16, the reading card 310 preferably includes an upper sheet or cover member 326 and a lower sheet or cover member 328 that are disposed on the main surfaces 320 and 322, respectively, of the card body or base member 312. The cover members 326 and 328 protect the light source 314 if present and can be printed to provide a pleasing appearance to the light card 310. Preferably, the cover members 326 and 328 are secured, adhered, or laminated to the card base 312 via glue, adhesive, or other suitable securing mechanism. The upper cover member 326 is preferably formed from a relatively thin and sufficiently flexible material such that a user may push a portion 340 of the upper cover member 326, for example, toward the card base 312 in order to move the end 18 of the conductive switch bar 16 into contact with the battery 50 in a manner similar to that previously described with the other light cards. The lower cover member 328 can be formed from a similar material to the upper cover member 326.

In order to properly align the cover members 326 and 328 relative to the respective main surfaces 320 and 322 of the card body 326, the edge 324 extending around the periphery of the card base 312 includes an upstanding rim or flange 329 that extends up from each of the main surfaces 320 and 322 to form large recessed areas 320*a*, 322*a* in which the respective cover members 326 and 328 are snugly received. Preferably, the rim 329 extends generally orthogonal to each of the flat, main surfaces 320 and 322. In this manner, the flange 329 generally provides an alignment guide for the correct positioning of the cover members 326 and 328 on the main surfaces 320 and 322 of the card base 312. With the rim flange 329, the peripheries of the rectangular cover members 326 and 328 can be properly aligned with the peripheral edge 324 of the generally rectangular card base 312 so that the peripheries of the cover members 326 and 328 do not extend beyond the peripheral edge 324 of the card base 312. Further, the peripheral flange 329 also provides strength to the card base member 312.

As best shown in FIG. 17, the cover members 326 and 328 also preferably have a relatively thin construction, e.g., approximately less than about 1 mm in thickness, so that their thickness is equal to the height of the rim flange 329 that extends about the main surfaces 320 and 326 and up therefrom. In this manner, with the cover members 326 and 328 seated snugly in the respective recessed areas 320*a*, 322*a* bounded by the flange 329, they form generally smooth, main surfaces 401*a*, 401*b* across cover members 326 and 328 and the upper end of the flange 329.

The cover members 326 and 328 also include spaced through openings 331 and 332 sized so that the two spaced reading lens portions 395 and 396 fit therethrough when the upper and lower cover members 326 are adhered to the card base 312. In the illustrated form shown in FIG. 17, the preferred thickness and convex curvature of the lenses with respect to the thickness of the card 310 and specifically the thin portion 321 of the card body member 326 having the cover members 326 and 328 laminated thereto is such that the majority of outer lens surfaces 398 and 399 extend beyond the cover members 326 and 328 as previously has been discussed. Manifestly, having the lens outer surfaces 398 and 399 generally flush with the cover member surfaces 326*a* and 328*a* is also possible.

If the card 310 includes the optional light source 314, then the upper cover member 326 (or the lower cover member 328) also includes a light transmissive portion 334 aligned with the LED 20. In one form, the light transmissive portion 334 is an aperture 336 extending through the upper card member 326, as shown in FIG. 15. In an alternative form, the light transmissive portion 334 is a transparent or translucent portion of the cover member 326 that permits transmission of light therethrough. In such alternative form, when both cover members 330 and 332 are adhered to the card base 312 using a water proof adhesive or other fastener, the card 310 is preferably water or moisture proof because the light source 314 is contained within a sealed structure.

Turning to FIGS. 18-21, an alternative reading card 410 is illustrated that includes an enlarged, single reading lens 494 that is integrally molded with a card base or body member 412. The reading card 410 is similar to the previously described reading card 310; therefore, only the differences therefrom will be discussed in detail hereinafter.

In reading card 410, the reading lens 494 preferably extends almost the entire length of the card base 412 to provide a relatively large area along the length of the card 410 through which reading can occur. As with reading card 310, the reading lens 494 is preferably formed in the same mold and from the same material as the card base 412. In this manner, the relatively large reading lens 494 in the card 410 can also be precisely formed into a reading lens integrated into the card base 412 having a generally well defined diopter rating to provide enhanced optics over Fresnel-type lenses. At the same time, the reading lens 494 integrated with the card base 412 provides increased rigidity and strength to the card and eliminates lens pop-out that is possible in existing multi-component cards having lenses, as has previously been discussed. The reading lens 494 also includes a continuous, generally smooth light refractive surface 398 that has a curvature thereof for refracting light therethrough. Preferably, the light refractive surface 398 is convex relative to a corresponding and generally flat main surface 420 of the card base 412. As with the reading card 310, the generally flat surface 420 can also include other enhancements, such as depressions and embossments.

Figure 19:
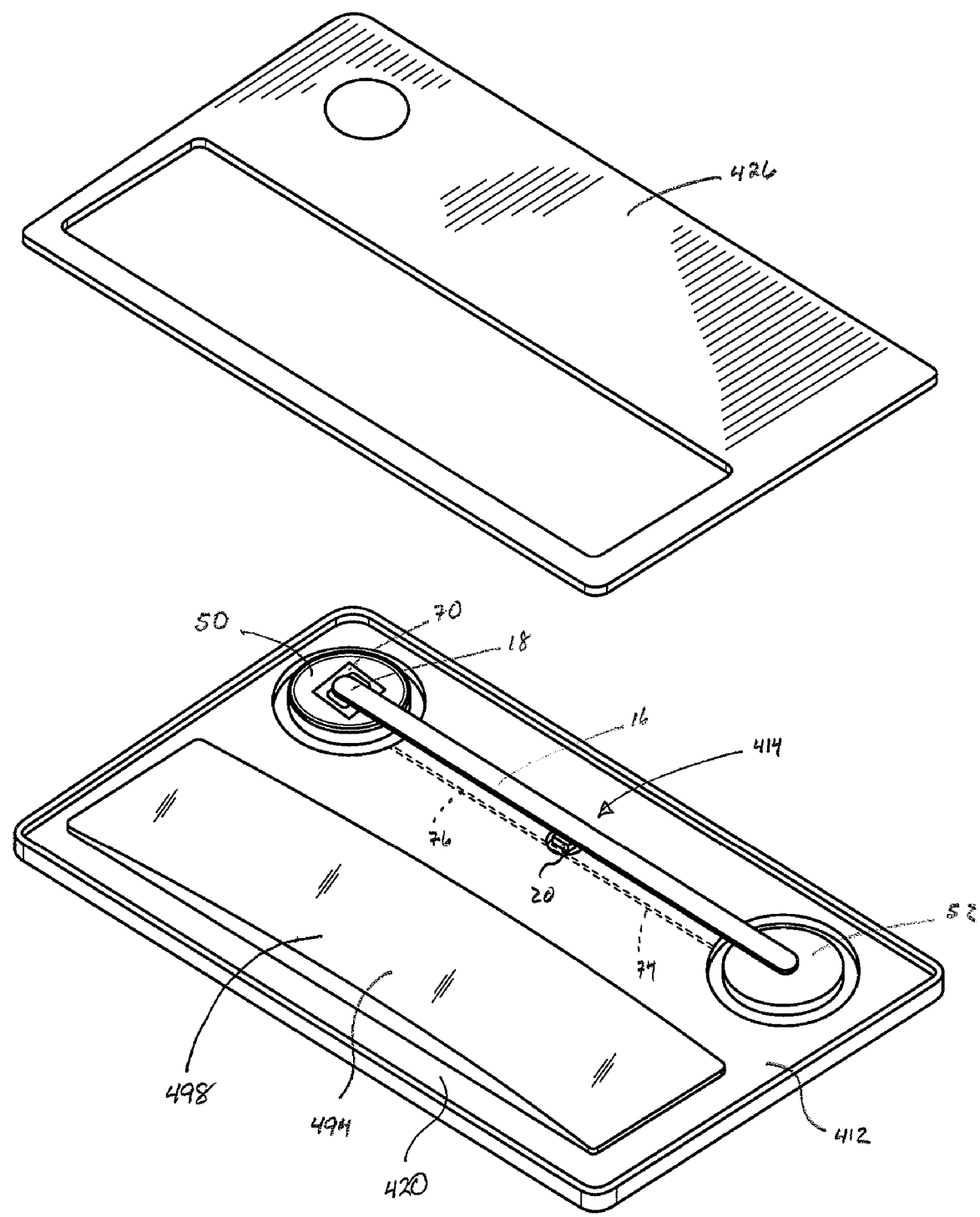
FIG. 19 is an exploded view of the reading card of FIG. 18 showing an upper sheet member removed from the card base carrying a light and a compactly configured switching mechanism therefor.
Figure 20:
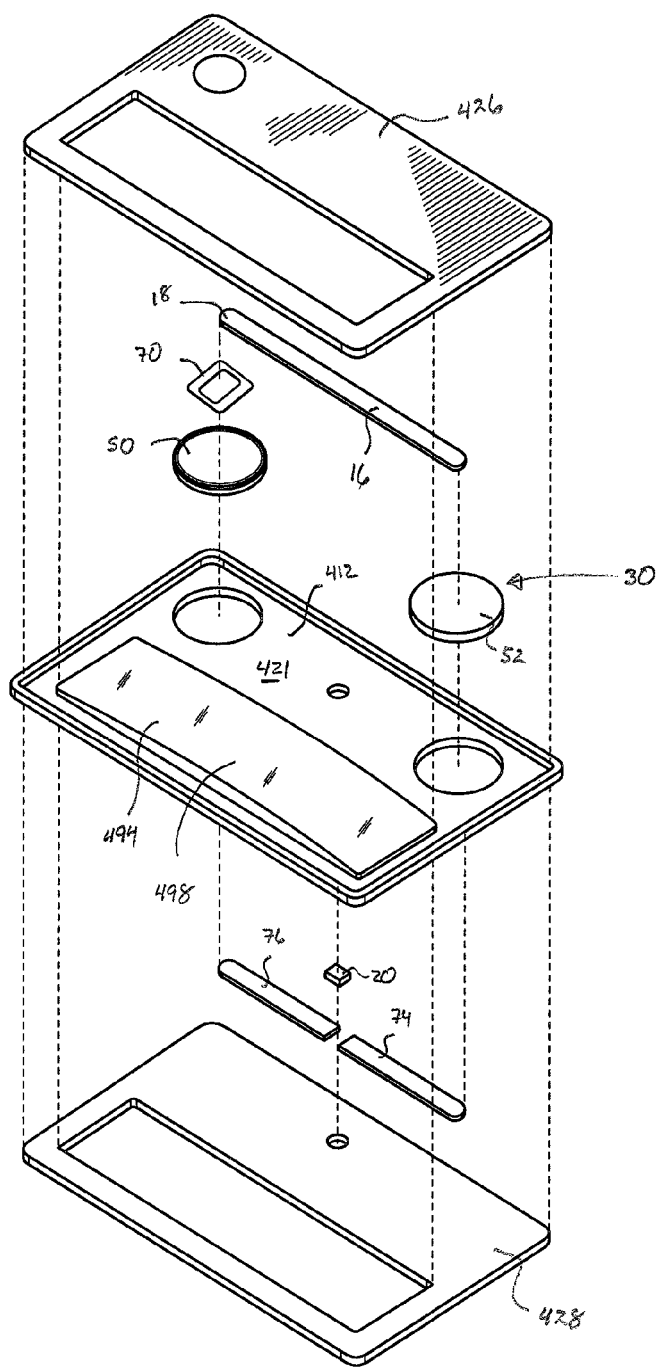
FIG. 20 is an exploded view of the reading card of FIG. 18 showing a lower sheet member and the components of the switching mechanism.
Figure 21:
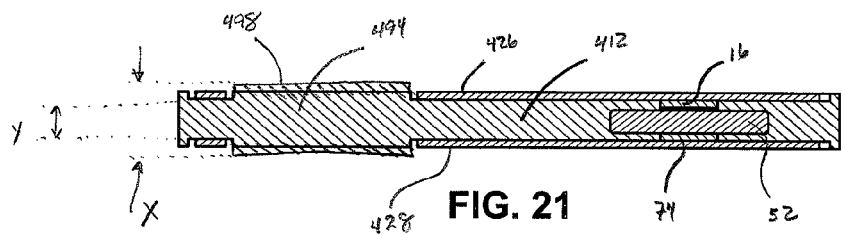
FIG. 21 is a cross-sectional view taken along line 21-21 of FIG. 18 showing the thickness of the enlarged reading lens portion being greater than that of the remaining thin portion of the card base.

As best shown in FIGS. 19-21 and similar to the previous described card 310, the curvature of the light refractive surface 498 is such that this surface extends beyond the main surface 420 of the remaining thin, flat portion 421 of the card base 412. Accordingly, there will be at least a portion of the lens 494 that will have a thickness X that will be greater than thickness Y of the card base 412 (FIG. 21). It will be appreciated that similar to the previous reading card 310, the long, single lens 494 can have similarly configured and sized opposite, upper and lower surfaces such that both the upper and lower surfaces of the lens 494 may extend beyond the thinner portion 421 of the card base 412, as well as the cover members 426 and 428 attached thereto depending on the thickness thereof.

The card 410 also includes an optional lighting mechanism 414 which projects light through an aperture in the lower cover member 428 that preferably includes the features previously described with the prior light cards. However, with the card 410, the lighting mechanism 414 is arranged in a more compact configuration as best shown in FIG. 19 to provide space on the card base 412 for the relatively large reading lens portion 494 formed integrally therewith. For example, the lighting mechanism 414 preferably includes the surface mount LED 20, the switch bar 16, the thin power source 30 in the form of two disc batteries 50 and 52, and the pair of conductive bars 74 and 76. Further, the insulator member 70 is employed to keep the end 18 of the switch bar 16 spaced from the battery 50 until the switch bar end 18 is pushed into contact with the power source 30 by the user. While the previous light card 310 had a generally triangularly-shaped configuration of the switch bar 16 and conductive bars 76, 74 (see FIG. 15), in lighted reading card 410, the switch bar 16 generally overlaps both conductive bars 74, 76, which are aligned with each other, such that the lightening mechanism 414 is arranged in a generally linear configuration in order to accommodate the relatively large reading lens 494. That is, the switch bar 16 is disposed on one side of the card base 412 and the conductive bars 74, 76 substantially overlap the switch bar 16 from the opposite side of the card base 412 to provide a compact configuration thereof. In this compact configuration, the lightening mechanism 414 requires less than half the surface area of the card base 412, so that at least the remaining half of the surface area of the card base 412 is available for the reading lens 494.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A reading card comprising:
a card base member of a predetermined, hard material;
a generally thin, flat portion of the card base member; and
a reading lens portion of the card base member that is thicker than the thin, flat portion and which is configured to provide the lens portion with a well-defined diopter rating, the reading lens portion being integral with the thin, flat portion so that the card base member has a unitary form with both the generally thin, flat portion and the reading lens portion of the card base member being of the same predetermined, hard material, wherein the reading lens portion has opposite, generally smooth surfaces for refracting light therethrough.

2. The reading card of claim 1, wherein the reading lens portion has opposite surfaces that each have a generally convex configuration relative to the thin, flat portion of the card base member for refracting light therethrough.

3. The reading card of claim 1, wherein the predetermined, hard material of the card base member is an acrylic polycarbonate material.

4. The reading card of claim 1, wherein the card base member includes an illumination source mounted thereto.

5. The reading card of claim 4, wherein the thin portion of the card base member includes opposite, generally flat surfaces; and
at least one cover member having an opening therethrough sized and configured to receive the reading lens portion therein with the cover member attached to one of the generally flat surfaces.

6. The reading card of claim 5, wherein the cover member has a predetermined thickness such that the reading lens portion extends beyond the cover member.

7. The reading card of claim 5, wherein the base member has an illumination source mounted thereto and the cover member includes a light transmissive portion aligned with the illumination source.

8. The reading card of claim 7, wherein the light transmissive portion comprises an aperture in the cover member.

9. The reading card of claim 5, wherein the card base further comprises an upstanding rim extending about the card base member for aligning the cover member thereon.

10. The reading card of claim 1, wherein the viewing lens portion comprises two spaced apart viewing lenses.

11. The reading card of claim 1, wherein the well-defined diopter rating of the reading lens portion is one of 2.0 and 2.5.

12. A reading card comprising:
a card base member of a predetermined, hard material:
a generally thin, flat portion of the card base member;
a reading lens portion of the card base member that is thicker than the thin, flat portion and which is configured to provide the lens portion with a well-defined diopter rating, the reading lens portion being integral with the thin, flat portion so that the card base member has a unitary form with both the generally thin, flat portion and the reading lens portion of the card base member being of the same predetermined, hard material, wherein the card base member includes an illumination source mounted thereto;
a conductive switch bar and a power source mounted to the card base member; and
an end of the switch bar that is arranged and configured for being pushed toward and into direct contact with the power source for energizing the illumination source.

13. A reading card comprising:
a card base member having opposite main surfaces so that the card base member has a predetermined thickness therebetween;
a reading lens portion of the card base member that is integrally molded in a unitary form with the card base member;
a light refractive surface of the reading lens portion having a predetermined curvature for refracting light therethrough; and
at least a portion of the light refractive surface of the reading lens portion configured to extend beyond the adjacent main surface so that at least a portion of the reading lens portion is thicker than the predetermined thickness between the main surfaces of the card base member, wherein the light refractive surface comprises opposite, generally smooth curved surfaces that provide the lens portion with a well-defined diopter rating.

14. The viewing card of claim 13, wherein the predetermined curvature of the lens portion light refractive surface is convex.

15. The reading card of claim 13, wherein each of the opposite, generally smooth surfaces of the viewing lens portion extends beyond the corresponding opposite main surfaces of the card base member.

16. The reading card of claim 13, wherein the well-defined diopter rating of the reading lens portion is one of 2.0 and 2.5.

17. A reading card comprising:
a card base member;
an integral lens portion of the card base member having opposite, smooth light refractive surfaces that are configured to provide the lens portion with a well-defined diopter rating; and
a predetermined, hard material of the card base member for minimizing damage to the integral lens portion thereof.

18. The reading card of claim 17, wherein the card base member has a generally thin portion thereof, and the integral lens portion is thicker than the thin portion of the card base member.

19. The reading card of claim 17, wherein the opposite, smooth light refractive surfaces of the integral lens portion have a generally convex configuration relative to the card base member for refracting light therethrough.

20. The reading card of claim 17, wherein the predetermined hard material is acrylic polycarbonate.

21. The reading card of claim 17, wherein the well-defined diopter rating of the integral lens portion is one of 2.0 and 2.5.

* * * * *

UNITED STATES PATENT AND TRADEMARK OFFICE
CERTIFICATE OF CORRECTION

| | | |
|---|---|---|
| PATENT NO. | : 7,896,250 B2 | Page 1 of 1 |
| APPLICATION NO. | : 11/673337 | |
| DATED | : March 1, 2011 | |
| INVENTOR(S) | : Michael Waters | |

It is certified that error appears in the above-identified patent and that said Letters Patent is hereby corrected as shown below:

In the Claims

Claim 12, Column 14, Line 30, delete "material:" and insert -- material; --.

Claim 14, Column 14, Line 65, delete "viewing" and insert -- reading --.

Signed and Sealed this
Seventeenth Day of May, 2011

David J. Kappos
*Director of the United States Patent and Trademark Office*